(12) United States Patent
Ragatz et al.

(10) Patent No.: US 10,816,395 B2
(45) Date of Patent: Oct. 27, 2020

(54) COMPACT HIGH DENSITY ROTARY OPTICAL FILTER WHEEL ASSEMBLIES

(71) Applicant: Li-Cor, Inc., Lincoln, NE (US)

(72) Inventors: Andrew George Ragatz, Lincoln, NE (US); Christopher Lesiak, Lincoln, NE (US); Irma Nicholls, Lincoln, NE (US); Mark Fiedler, Lincoln, NE (US); Ahmed Bouzid, Lincoln, NE (US)

(73) Assignee: I-COR, Inc., Lincoln, NE (US)

( * ) Notice: Subject to any disclaimer, the term of this patent is extended or adjusted under 35 U.S.C. 154(b) by 0 days.

(21) Appl. No.: 16/682,383

(22) Filed: Nov. 13, 2019

(65) Prior Publication Data
US 2020/0149957 A1    May 14, 2020

Related U.S. Application Data

(60) Provisional application No. 62/767,385, filed on Nov. 14, 2018.

(51) Int. Cl.
  *G01J 1/04*   (2006.01)
  *G01J 1/42*   (2006.01)
  *G02B 5/20*   (2006.01)

(52) U.S. Cl.
  CPC .............. *G01J 1/0492* (2013.01); *G01J 1/42* (2013.01); *G02B 5/201* (2013.01)

(58) Field of Classification Search
  CPC .......... G01J 1/0492; G01J 1/42; G02B 5/201; G02B 26/008

USPC ....................................................... 250/226
See application file for complete search history.

(56) References Cited

U.S. PATENT DOCUMENTS

| 4,345,840 | A | * | 8/1982 | Goetz | G01J 3/02 |
| | | | | | 250/339.11 |
| 5,682,244 | A | * | 10/1997 | Barlow | G01P 5/001 |
| | | | | | 250/458.1 |
| 2009/0080194 | A1 | | 3/2009 | Bouzid et al. | |
| 2015/0131137 | A1 | | 5/2015 | Burry et al. | |
| 2015/0146278 | A1 | | 5/2015 | Thomas | |

OTHER PUBLICATIONS

International Search Report and Written Opinion from International Patent Application No. PCT/US2019/061435, 12 pages, dated Jan. 29, 2020.

* cited by examiner

*Primary Examiner* — Seung C Sohn
(74) *Attorney, Agent, or Firm* — Leydig, Voit & Mayer, Ltd.; Gerald T. Gray

(57) ABSTRACT

Filter wheel assemblies with a single actuation point to control positioning of front and rear optical filter elements simultaneously and to provide high channel density with a plurality of selectable optical filter pairs. A filter wheel assembly may include a plurality of optical filter element pairs arranged around a common axis, wherein each of the plurality of optical filter element pairs includes a first filter element and a complementary filter element, wherein each first filter element and each complementary filter element has a surface having a normal component directed toward an inner portion of the filter wheel assembly.

25 Claims, 6 Drawing Sheets

|       | 1       | 2       | 3       | 4       | 5       | 6       | 7       | 8       |
|-------|---------|---------|---------|---------|---------|---------|---------|---------|
| Front | 450     | 500     | 550     | 600     | 650     | 700     | 750     | 800     |
| Rear  | 475-480 | 525-530 | 575-580 | 625-630 | 675-680 | 725-730 | 775-780 | 825-830 |

*FIG. 4*

COMPACT HIGH DENSITY ROTARY OPTICAL FILTER WHEEL ASSEMBLIES

CROSS REFERENCES TO RELATED APPLICATIONS

This patent application claims priority to U.S. Provisional Patent Application No. 62/767,385, entitled "COMPACT HIGH DENSITY ROTARY OPTICAL FILTER WHEEL ASSEMBLIES," filed Nov. 14, 2018, which is incorporated herein by reference in its entirety.

BACKGROUND

The desire to add more channel options to a single optical imaging system (i.e. fluorescence imaging system) to take advantage of the maximum number of excitation/emission combinations has generally increased the size of the imaging system. Certain combinations of excitation/emission channels can be designed into a single set of fixed, multi-notch filters, however this method may be very limiting in the maximum number of channels achieved and may be expensive to manufacture. Additionally, the need for each desired channel to have a specific combination of a front filter (i.e., at the imaging target side) that rejects the excitation wavelength and a rear filter (i.e., at imaging detector side) that passes only the emission wavelength leaves limited compact solutions and requires multiple actuators to independently control separate front and rear filters.

BRIEF SUMMARY

Various embodiments advantageously provide filter wheel assemblies with a single actuation point to control positioning of front and rear optical filter elements simultaneously. The various assembly embodiments also provide high channel density with a plurality of selectable optical filter pairs. In some embodiments, each optical filter pair includes a rejection filter element for rejecting excitation light and a complementary emission filter element. In some embodiments, a window, a non-filtering optical component, or other optical components may be used in place of any filter element (e.g. imaging non-fluorescent or non-excitable materials). In some embodiments, a two-level offset filter wheel configuration is implemented. In some embodiments, additional channel flexibility is implemented by use of long-pass excitation rejection filters rather than band-pass filters.

According to an embodiment, a filter wheel assembly is provided that includes a plurality of optical filter element pairs arranged around a common axis, wherein each of the plurality of optical filter element pairs includes a first filter element and a complementary filter element, wherein each first filter element and each complementary filter element has a surface having a normal component directed toward an inner portion of the filter wheel assembly. In an embodiment, each complementary filter element is diametrically opposed to the corresponding first filter element relative to the common axis. In certain aspects, the plurality of optical filter pairs are arranged in a single level, the single level being defined by a plane arranged substantially normal to the axis. In certain aspects, the plurality of optical filter pairs are arranged in two or more levels, each of the two or more levels defined by a plane arranged substantially normal to the axis and parallel to the planes of the other level or levels. In certain aspects, each first filter element is arranged on a first one of the two or more levels, and each corresponding complementary filter element is arranged on a second one of the two or more levels.

According to another embodiment, an imaging system is provided that includes a source subsystem having a sample platform configured to hold a sample (that may contain one or more targets of interest), and having a light source that illuminates (at least a portion of) the sample platform with light (e.g., at least a portion of the sample on the sample platform). The imaging system also includes a detector subsystem for detecting light from the sample platform, and including a light detector having an array of sensing locations. The imaging system also includes an optical imaging system comprising optical elements configured to receive (at least a portion of) light from the sample platform along a first light path and to pass or to direct the received light to the light detector along a second light path, and a rotatable filter wheel assembly comprising a plurality of optical filter pairs arranged around a common axis, wherein each of the plurality of optical filter pairs includes a first filter and a complementary filter, wherein each first filter and each complementary filter has a surface having a normal component directed toward an inner portion of the rotatable filter wheel assembly. The rotatable filter wheel assembly may be arranged in a first filter configuration, wherein rotation of the filter wheel assembly about the common axis changes the configuration to a second filter configuration, wherein in the first filter configuration a first one of the first filters is positioned in the first light path and the corresponding complementary filter is positioned in the second light path, and in the second filter configuration a second one of the first filters is positioned in the first light path and the corresponding complementary filter is positioned in the second light path.

In certain aspects, the optical imaging system comprises a bi-telecentric optical imaging system including imaging optics arranged and positioned such that a first telecentric space exists in the first light path between the sample platform and the entry aperture, wherein Principal rays from a plurality of field points on the sample platform are parallel to each other when passing through the first filter in the first light path, and such that a second telecentric space exists in the second light path between the light detector and the exit aperture, wherein the Principal rays from the plurality of field points are parallel to each other when passing through the second filter in the second light path. In certain aspects, the bi-telecentric optical imaging system comprises an Offner relay mirror system arrangement comprising a first mirror element having a spherical mirror surface and a second mirror element having a spherical mirror surface, wherein the entry aperture and the exit aperture each comprise a portion of the first mirror element.

In certain aspects, the plurality of optical filter pairs are arranged in a single level, said single level being defined by a plane arranged substantially normal to the axis. In certain aspects, the plurality of optical filter pairs are arranged in two or more levels, each of the two or more levels defined by a plane arranged substantially normal to the axis and parallel to the other planes. In certain aspects, each first filter is arranged on a first one of the two or more levels, and wherein each corresponding complementary filter is arranged on a second one of the two or more levels.

In certain aspects, the light source emits a beam of uniform illumination when impinging on the sample platform. In certain aspects, the light source emits a beam of uniform illumination having a line-shaped profile when impinging on the sample platform. In certain aspects, the light source may comprise a diode laser, a LED or another light source.

In certain aspects, the imaging system, further includes at least one or more additional light sources. In certain aspects, at least one of the one or more additional light sources is on a same side of the sample platform as the light source. In certain aspects, at least one of the one or more additional light sources is on an opposite side of the sample platform as the light source. In certain aspects, at least one of the one or more additional light sources is both on a same side of the sample platform as the light source and an opposite side of the sample platform as the light.

In certain aspects, the light detector comprises at least one detector selected from the group consisting of a CCD array detector, a CMOS detector, a sCMOS detector, a photomultiplier device, a photodiode, a plurality of photodiodes, and a focal plane array.

In certain aspects, each first filter comprises a rejection filter that blocks light having a wavelength less than a specific wavelength, and wherein each corresponding complementary filter comprises a band-pass filter that allows light having a wavelength within a specific range of wavelengths greater than the specific wavelength to pass, and wherein the specific wavelength of each first filter is different than the specific wavelength of the other first filters.

In certain aspects, each first filter comprises a rejection filter that blocks light having a wavelength less than a specific wavelength, and wherein each corresponding complementary filter comprises a long-pass filter that allows light having a wavelength range greater than the specific wavelength to pass, and wherein the specific wavelength of each first filter is different than the specific wavelength of the other first filters. In certain aspects, relevant filter wavelengths may be anywhere within the ultra-violet to visible to far-red spectrum.

In certain aspects, the rotatable filter wheel is manually adjustable or rotatable. In certain aspects, the imaging system further includes an adjustment mechanism configured to rotate the filter wheel assembly responsive to a control signal. In certain aspects, the imaging system further includes a control system module comprising at least one processor, wherein the control system module is adapted to automatically control rotation of the filter wheel assembly. In certain aspects, the control system module is further adapted to acquire and store image data taken by the light detector from the detector subsystem.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings. In the drawings, like reference numbers indicate identical or functionally similar elements.

BRIEF DESCRIPTION OF THE SEVERAL VIEWS OF THE DRAWING(S)

FIG. 4 illustrates an example of filter attributes for a two-level filter wheel assembly including 8 different positions or channels.

DETAILED DESCRIPTION

Figure 1A:
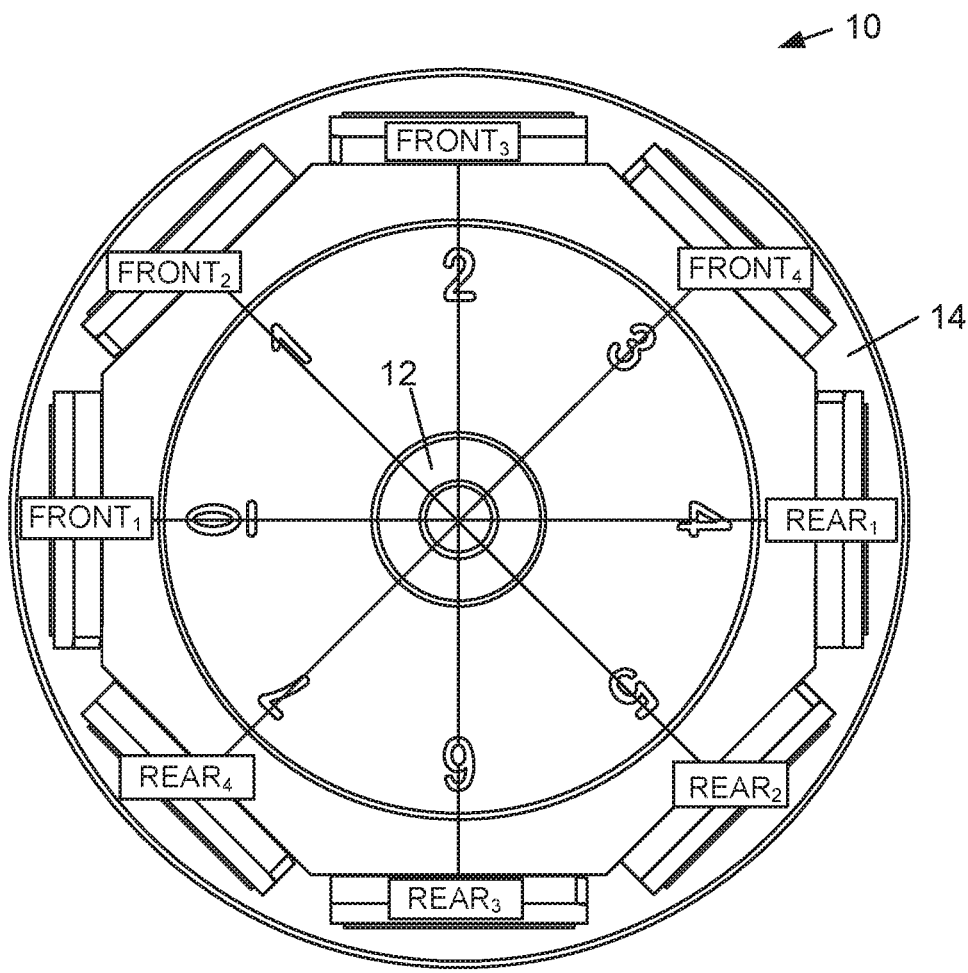
FIG. 1A illustrates a top view of a single-level filter wheel assembly 10 according to an embodiment.

FIG. 1A illustrates a top view of a single-level filter wheel assembly 10 according to an embodiment. The filter wheel assembly 10 includes a body structure 14 configured to hold a plurality of optical filter pairs arranged around an axis 12, e.g., an axis common to the plurality of optical filter pairs. In the specific embodiment shown in FIG. 1A, four optical filter pairs corresponding to four different positions or channels are shown, where each optical filter pair includes a first filter element and a complementary filter element. It should be appreciated that other embodiments may contain two or more optical filter pairs or two or more optical component pairs or a mixture of optical filter element and optical component pairs. Optical components might include optically transparent windows, mirror elements, refractive or diffractive elements, or other elements that direct or condition an incident light. In FIG. 1A, each first filter element is designated as a "Front" filter, and the complementary filter element is designated as a "Rear" filter. For example, a first filter pair includes optical filter elements $Front_1$ and $Rear_1$, a second filter pair includes optical filter elements $Front_2$ and $Rear_2$, etc. Each first filter element may be positioned on an opposite side of the axis 12 from the corresponding complementary filter element in an embodiment. For example, as shown in FIG. 1A, each of the plurality of optical filter pairs may include a first filter diametrically opposite, or diametrically opposed to, the complementary filter relative to the axis 12. For example, each first filter (e.g., $Front_1$) may be positioned on an opposite side of the axis 12, along a diameter, from the corresponding complementary filter (e.g., $Rear_1$). The plurality of optical filter pairs may be arranged such that, for each optical filter pair, a direction vector from the first filter passing through the common axis 12 passes through the corresponding complimentary filter of that first filter. Examples of such direction vectors are shown in FIG. 1A.

In another embodiment, for one or multi-level assemblies, optical filter pairs may be positioned around the filter wheel in a manner where positions of the first filter is located on the filter wheel other than 180° opposite the complementary filter. For example, optical filter pairs may be positioned at any angle between about 45° and about 315° relative to each other. In such embodiments, optical elements configured to redirect light within the filter wheel may be strategically positioned within the filter wheel. Such optical elements might include mirrors, windows, prisms or other elements that operate to reflect, refract, condition, direct or redirect light impinging thereon. Further, such optical element(s)

may be static/un-moveable, or they may be controllable to move (e.g., using a rotatable motor or actuator as an example) and thereby select a different complementary filter. As an example, a mirror element may be positioned at the axis 12 shown in FIG. 1A; the mirror may act to redirect light imping thereon at a 900 angle or other angle. In this example, light entering the filter wheel through filter Front$_1$ may be directed 90° to filter Rear$_3$ as the complementary filter. If the optical element directing the light is controllable, e.g., by way of a controllable/rotatable mirror mount, the optical element may be controlled to select a desired filter element as a complementary filter. As such optical filter pairs may be selected as desired in such embodiments. A control system module (not shown) including at least one processor, may be adapted to provide a control signal to automatically control adjustment of the controllable optical element based on an algorithmic protocol or responsive to user input.

For line imaging systems and applications, it may be desirable to have optical filter pairs arranged 180° opposite each other, whereas for point imaging systems and applications, relative filter angles of other than 180° opposite each other may be useful.

In an embodiment, selection of a filter element pair may be done by controllably rotating the assembly about the axis 12 to the desired position. The rotatable filter wheel assembly 10 may be manually adjustable and/or rotatable using an adjustment mechanism configured to rotate the filter wheel assembly responsive to a control signal. For example, the control system module (not shown) including at least one processor, may be adapted to provide a control signal to automatically control rotation of the filter wheel assembly based on an algorithmic protocol or responsive to user input. The control system module includes a memory and is further adapted to acquire and store image data taken by a light detector from the detector subsystem.

In certain embodiments, at least one of the first filters and its corresponding complementary filter have planar surfaces, and the at least one first filter and the corresponding complementary filter are arranged such that the planar surface of the at least one first filter and the planar surface of the corresponding complementary filter are arranged in a specified relationship to each other. In the example embodiment shown in FIG. 1A, all first filters and all complementary filters are shown having planar surfaces.

Figure 1B:
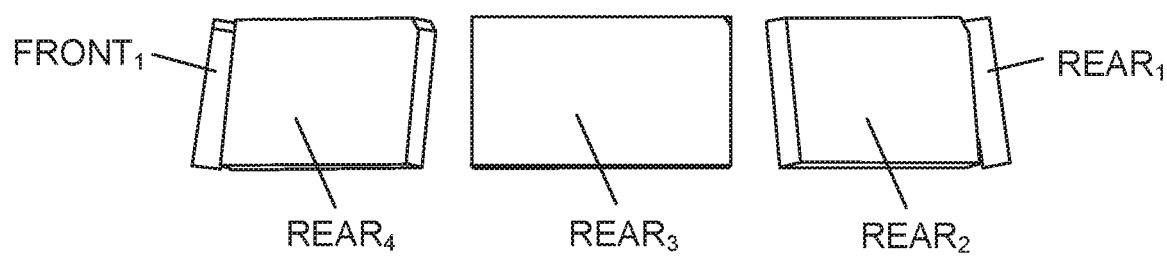
FIG. 1B is a side view of the single level filter wheel assembly of FIG. 1A showing only the optical filter elements.

In certain aspects, the specified relationship between the planar surfaces of a first filter and a complementary filter, or other optical components, may include a parallel relationship, e.g., the planar surfaces of the first filter and the second filter are parallel to each other, and may be parallel to the axis or angled relative to the axis. In certain aspects, the specified relationship may include a non-parallel relationship, e.g., the planar surfaces of the first filter and the complementary filter are not parallel to each other, and one or both may be angled relative to the axis. For example, as shown in FIG. 1B, the planar surfaces of the first filter (e.g., Front$_1$) and the complementary filter (e.g., Rear$_1$) may be arranged at an angle at which the planes would intersect (e.g., ∧). The planar surfaces could be parallel, positioned horizontally or at any angle ranging from 0°-360° in relationship to each other. The angles of the planar surfaces of the first filter and the complementary filter relative to the axis may differ from each other, and may differ from relative angles of the planar surfaces of the other first filters and complementary filters, or they may be the same as the relative angles of the planar surfaces of the other first filters and complementary filters. In the embodiment shown in FIG. 1A, planar surfaces of the optical filter elements are arranged such that a normal of the planar surface facing the inner portion of the filter wheel assembly intersects with the axis 12. In other embodiments, for one or multi-level assemblies, one or more or all optical filter elements may be oriented such that the normal of the planar surface of the filter element does not intersect the axis 12.

In one embodiment, each first filter comprises a rejection filter that blocks light having a wavelength less than a specific wavelength, and each corresponding complementary filter comprises a band-pass filter (e.g., emission filter) that allows light having a wavelength within a specific range of wavelengths greater than the specific wavelength to pass, and the specific wavelength of each first filter is different than the specific wavelength of the other first filters. In certain aspects, relevant filter wavelengths may be anywhere within the ultra-violet to visible to far-red spectrum.

In another embodiment, each first filter comprises a rejection filter that blocks light having a wavelength less than a specific wavelength, and each corresponding complementary filter comprises a long-pass filter that allows light having a wavelength range greater than the specific wavelength to pass, and the specific wavelength of each first filter is different than the specific wavelength of the other first filters.

In another embodiment, optical components other than optical filter elements may be used in place of any or all first filter elements or second, complementary filter elements shown in FIG. 1A, or any other embodiment. For example, for bright light field imaging embodiments, such as LED or other RGB imaging applications, an optical component pair (e.g., Front$_3$ and Rear$_3$) may include one or more optical windows or other optical component(s).

In other embodiments, one optical filter pair may include a rejection filter and a (complementary) band-pass filter and another optical filter pair may include a rejection filter and a (complementary) long-pass filter, or combination of a rejection and an emission filter type, or other filter-type combination.

In certain aspects, the plurality of optical filter pairs are arranged symmetrically around the common axis 12. For example as shown in FIG. 1A, each of the 8 positions (position "0" to position "7") for the individual optical filter elements are arranged with a 45° angle between each position. Depending on the number of optical components, or optical filter pairs, the angle may be between 0° and 90° between each position.

Figure 1C:
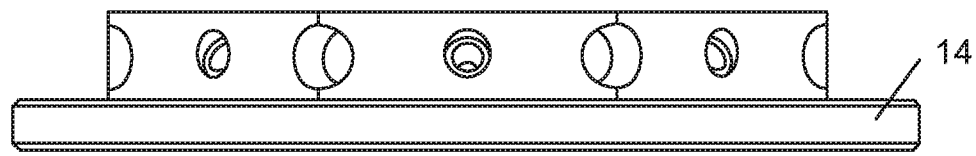
FIG. 1C shows a side view of the single-level filter wheel body structure 14 shown in FIG. 1A.
Figure 1D:
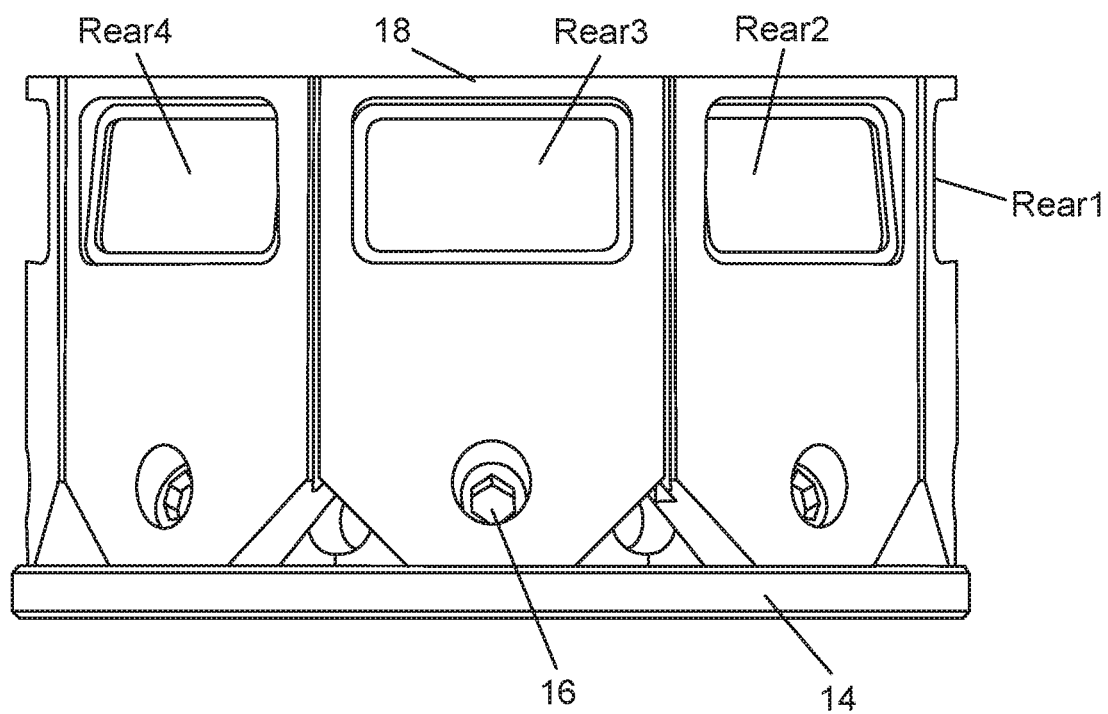
FIG. 1D shows a side view of the single level of individual filters of FIG. 1B within the filter wheel structure 14.

FIG. 1C shows a side view of the single-level filter wheel body structure 14 shown in FIG. 1A. FIG. 1D shows a side view of the single level of individual filters of FIG. 1B within the filter wheel structure 14, including a filter holding component 18 which is mounted to structure 14 and which is configured to hold the various filter component pairs (or optical component pairs) as shown. In certain aspects, a plurality of mounts or pockets are provided on or formed in filter holding component 18 to hold optical filter elements in position. The filters may be permanently retained or secured in the holding component 18 or the filters may be releasable or removably attached or secured to the holding component 18. Apertures or holes in the body structure 14 as shown in FIG. 1C allow the filter holding component 18 to be releasably secured by screws 16 to the body structure 14 as shown in FIG. 1D. In another embodiment, the filter holding component 18 is integrated with the body structure 14, e.g., filter pockets for holding individual optical filter elements may be formed in the body structure 14. In some embodiments, optical filter elements or optical components may be sealed, e.g., to help prevent stray or scattered light from reaching the optical detector system.

Figure 2A:
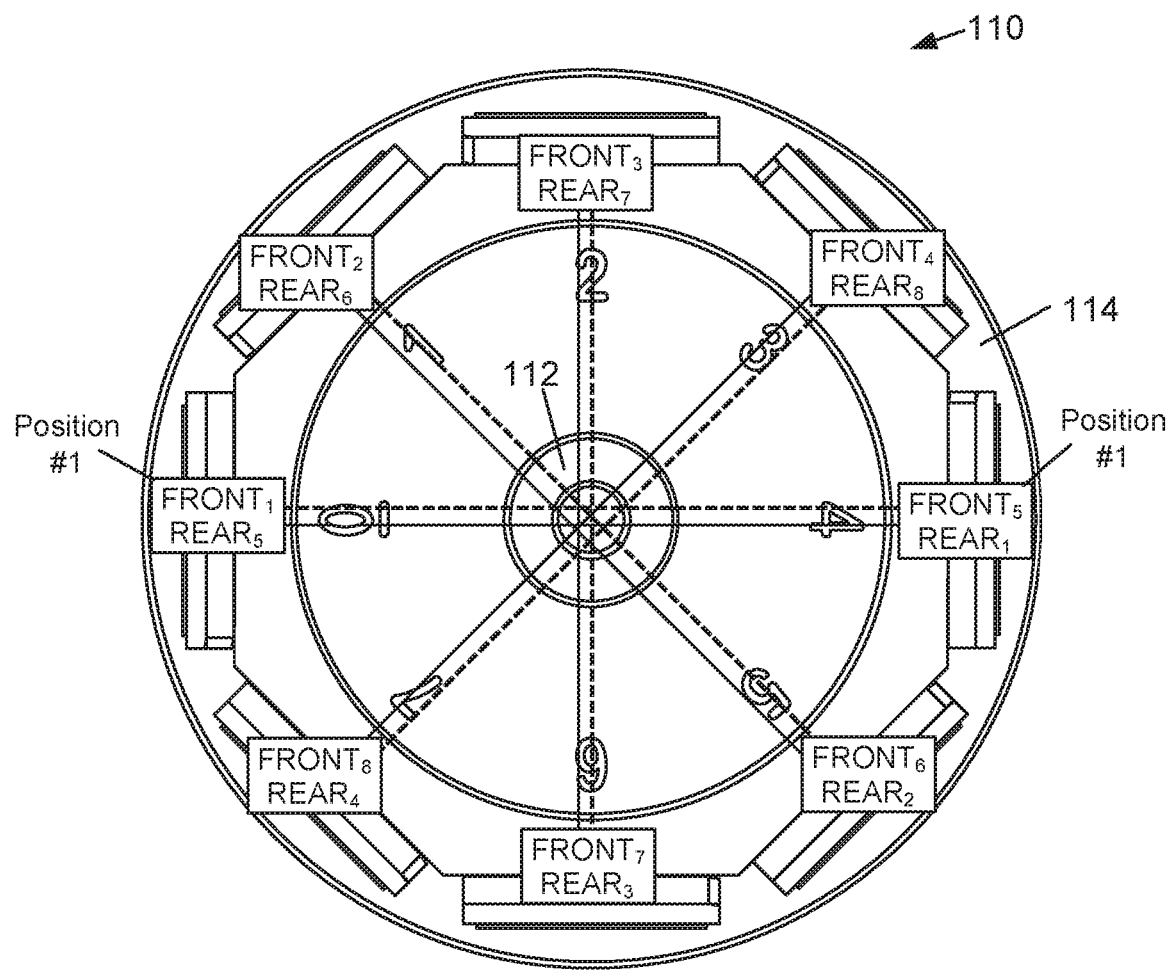
FIG. 2A illustrates a top view of a two-level filter wheel assembly 110 according to an embodiment.

FIG. 2A illustrates a top view of a two-level filter wheel assembly 110 according to an embodiment. The two-level filter wheel assembly 110 includes a body structure 114 configured to hold a plurality of optical filter pairs arranged around an axis 112, e.g., an axis common to the plurality of optical filter pairs. It should be appreciated that other embodiments may contain two or more optical filter pairs or two or more optical component pairs or a mixture of optical filter element and optical component pairs. Optical components might include optically transparent windows, mirror elements, refractive or diffractive elements, or other elements that direct or condition an incident light. In other embodiments, a filter wheel assembly may include more than two levels of optical filter elements or optical components, e.g., three levels or four levels or more as space constraints may allow.

In the specific two-level embodiment shown in FIG. 2A, eight (8) optical filter pairs corresponding to 8 different channels are shown, where each optical filter pair includes a first filter element and a complementary filter element. In FIG. 2A, each first filter element is designated as a "Front" filter, and the complementary filter element is designated as a "Rear" filter. For example, a first filter pair includes filter elements $Front_1$ and $Rear_1$, a second filter pair includes filter elements $Front_2$ and $Rear_2$, and so on. Each first filter may be positioned on an opposite side of the axis 112 from the corresponding complementary filter. The plurality of optical filter pairs may be arranged such that, for each optical filter pair, a direction vector from the first filter passing through the common axis 12 passes through the corresponding complimentary filter of that first filter.

In another embodiment, optical components other than optical filter elements may be used in place of any or all first filter elements or second, complementary filter elements shown in FIG. 2A, or any other embodiment. For example, for bright light field imaging embodiments, an optical component pair (e.g., $Front_3$ and $Rear_3$) may include one or more optical windows or other optical component(s). In certain aspects, the windows or other optical component(s) may be used to image non-fluorescent materials or non-excitable materials within or on a sample on the sample platform.

Figure 2B:
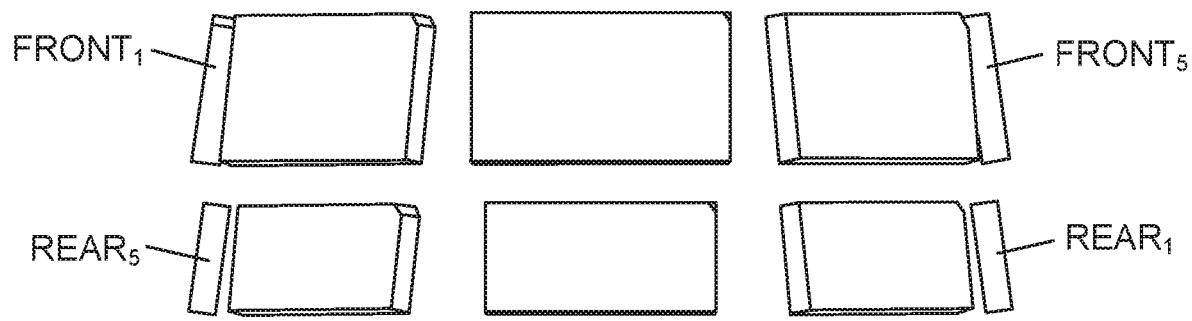
FIG. 2B is a side view of the two-level filter wheel assembly of FIG. 1A showing only the two levels of optical filter elements.

As shown in FIG. 2B, each of the first filters ("Front" filters) are located on one level and each of the complementary filters ("Rear" filters) are arranged on a second level below the first filter elements. It should be appreciated that the complementary rear filters may be positioned on the first level and the first filter may be positioned on the second level. In this manner, the axis 112 of the filter wheel assembly 110 may be tilted such that light entering and interacting with a front filter (e.g., "$Front_1$") on the first (or second) level passes through the axis 112 to pass through the imaging system to the complementary filter (e.g., "$Rear_1$") on the second (or first) level.

When tilting of the filters with respect to the optical axis of incident light is desirable, rather than tilting the individual filters relative to the wheel axis (12, 112), if space permits the filters may be mounted parallel to the wheel axis (e.g., axis 12 or 112) and the entire filter wheel structure (10 or 110) may be tilted with respect to the optical axis. Tilting may be desirable in the context of certain imaging systems, such as but not limited to a bi-telecentric imaging system as will be discussed in more detail below.

Figure 2C:
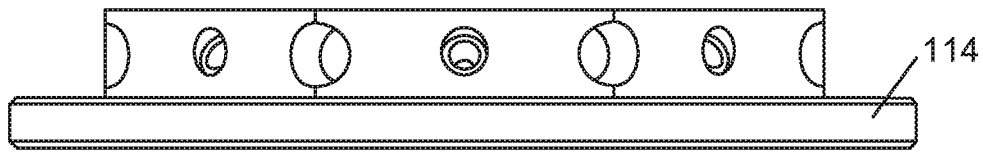
FIG. 2C shows a side view of the two-level filter wheel body structure 114 shown in FIG. 2A.
Figure 2D:
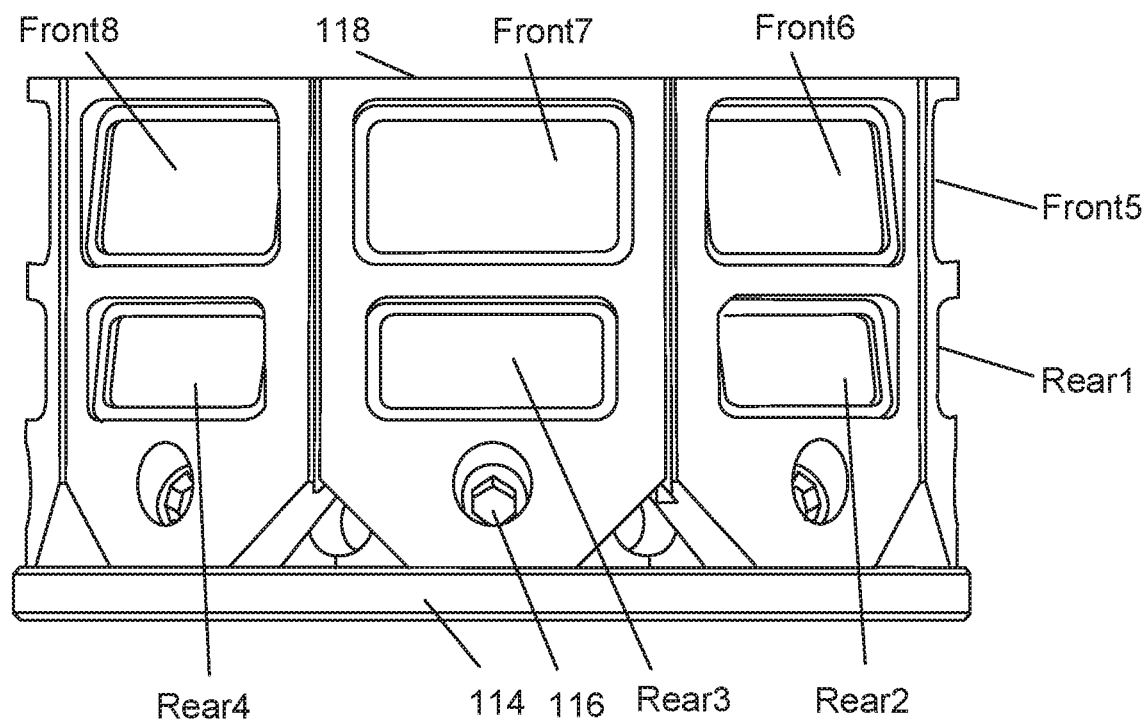
FIG. 2D shows a side view of the two levels of individual filters of FIG. 2B within the filter wheel structure 114.

FIG. 2C shows a side view of the two-level filter wheel body structure 114 shown in FIG. 2A. FIG. 2D shows a side view of the two levels of individual filters of FIG. 2B within the filter wheel structure 114, including a holding component 118, which is mounted to structure 114 and which is configured to hold the various filter component pairs (or optical component pairs) as shown. In certain aspects, a plurality of mounts or pockets are provided on or formed in filter holding component 118 to hold optical filter elements in position. The filters may be permanently retained or secured in the holding component 118 or the filters may be releasable or removably attached or secured to the holding component 118. Apertures or holes in the body structure 114 allow the filter holding component 118 to be releasably secured by screws 116 to the body structure 114 as shown in FIG. 2D. In another embodiment, the filter holding component 118 is integrated with the body structure 114, e.g., filter pockets for holding individual optical filter elements may be formed in the body structure 114. In some embodiments, optical filter elements or optical components may be sealed, e.g., to help prevent stray or scattered light from reaching the optical detector system.

In embodiments having more than two levels, a complementary filter may be positioned on a level adjacent to the first filter and/or on a different level. In some embodiments having two or more levels, levels may rotate separately from each other, e.g., using separate rotation or cam mechanisms and/or a clutch type mechanism. In some multi-level embodiments, a lift and rotate mechanism may be employed to shift up or down the levels of the assembly that may be active within an optical imaging system (e.g., select which level or levels may be positioned to interact with entry and exit light paths). In a specific four-level embodiment, as an example, the lift and rotate mechanism can be controlled to shift the levels up or down by two levels to provide for double the filtering capacity relative to a two-level assembly having the same number of filter components or optical components on each level.

In certain embodiments, the filter wheel assemblies are particularly useful with imaging systems that may benefit from multiple filter configurations, including but not limited to fluorescence imaging systems, optical imaging systems, or a combination of imaging systems. For example, to image in fluorescence, one or more targets of interest (e.g., within or on a sample where such targets of interest may contain a fluorescent material, which may be located on a sample platform) is illuminated by an optical signal having a first spectral content (excitation light) where a portion of that signal is absorbed by at least part of the target and emitted as optical signal having a second spectral content (emission light). The emission light is then detected by a detection system as a measure of the amount present of that target at the designated location. Imaging an area containing one or more targets of interest comprising fluorescent material, therefore, requires excitation light delivered to the target, an imaging system that collects light from the one or more targets of interest and projects the collected light onto an optical detector (e.g., detector array), and a means to separate the emitted fluorescence light from the portion of excitation light that makes its way through the imaging system. The latter, typically, includes one or more optical interference filters. Further, it may be desirable in fluorescence imaging systems (or other optical imaging systems) to change filter configurations to enable imaging using multiple excitation/emission channels for imaging multiple fluorescent materials for multiple targets of interest within or on a sample. In certain aspects, it may be desirable in fluorescence imaging systems (or other optical imaging systems) to change filter configurations to enable imaging of the autofluorescent properties of a sample. Further, it would be appreciated by one skilled in the art to image one or more targets of interest within or on a sample, which may be located on the sample platform, that contains non-fluorescent material or non-excitable material.

Wide-Field imaging, as considered herein, includes collecting light from a contiguous area and projecting it onto a detector array, such as a CCD or other detector having an array of sensing locations or pixels, at the same time in a way that preserves the relative locations of each point within the contiguous area. This is different from collecting light from one point at a time and sequentially scanning to a different point in order to cover a larger area, i.e. point scan imaging. It is also different from collecting light from a large area and condensing the total amount of light onto a detector and reading it as total signal. The latter is common for many measurement techniques that do not require specific location information.

One skilled in the art will understand that many types of useful sensors or detectors and arrays of sensors, such as but not limited to CCD and CMOS sensors can be used. Other useful sensors might include photodiodes, avalanche photodiodes, silicon photomultiplier devices, an array of photomultiplier tubes, a focal plane array, etc.

Figure 3:
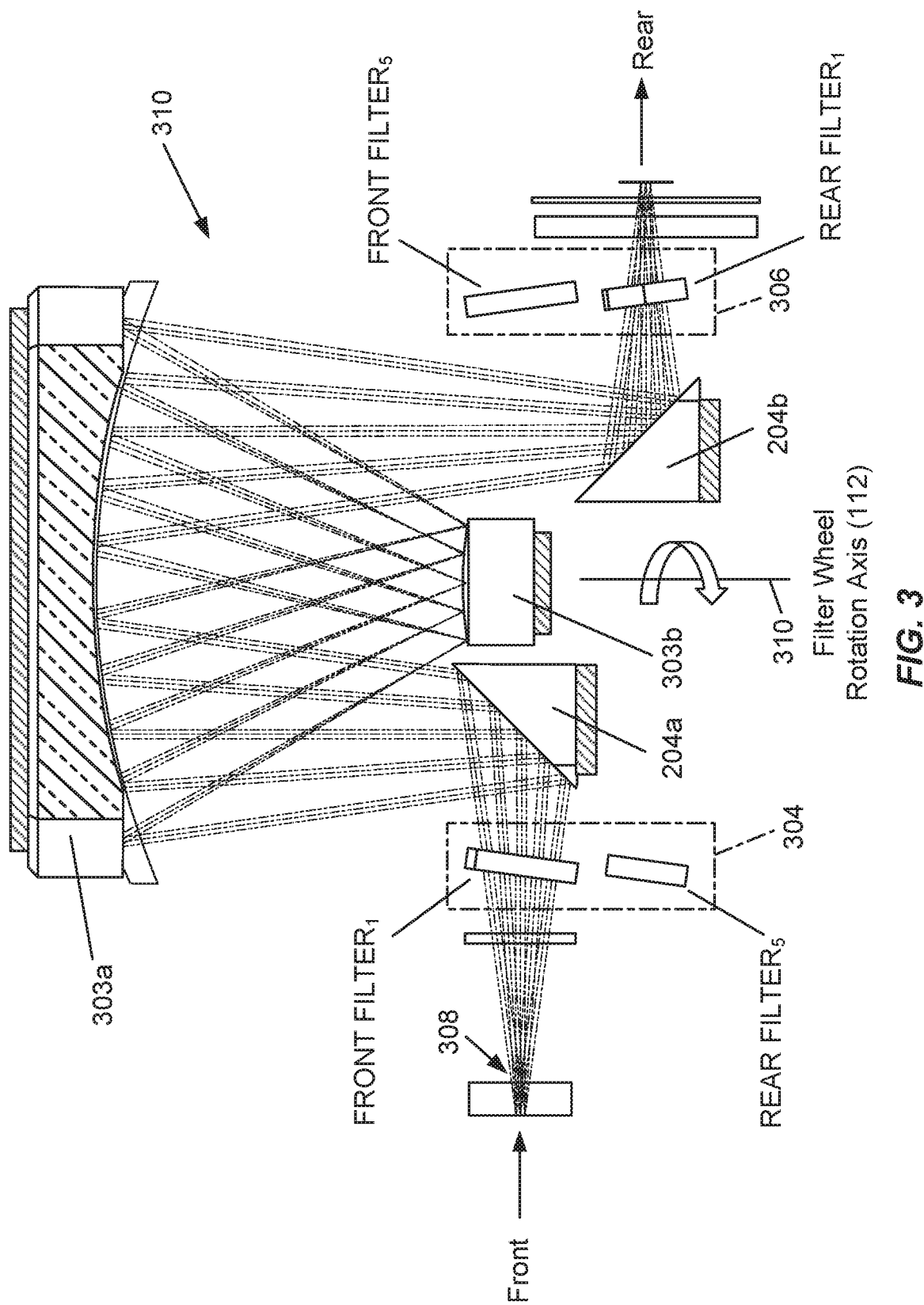
FIG. 3 illustrates a side view of a bi-telecentric imaging system including a two-level, multi-position filter wheel assembly according to an embodiment.

FIG. 3 illustrates a side view of a bi-telecentric imaging system including a 2-level, multi-position filter wheel assembly (e.g., filter assembly 110) according to an embodiment. Telecentric imaging refers to the case where the Principal or chief rays from all the points being imaged are parallel to each other. A design can be telecentric in the object space where the Principal or chief rays are parallel to each other in the space between the first element of the imaging optics and the sample. On the other hand, a design that is telecentric in the image space has its Principal or chief rays between the last element of the imaging optics and the detector array parallel to each other. Additional aspects and features of bi-telecentric imaging and bi-telecentric imaging systems may be found in U.S. Pat. No. 9,541,750, titled "TELECENTRIC, WIDE-FIELD FLUORESCENCE SCANNING SYSTEMS AND METHODS," which is incorporated herein by reference in its entirety.

The bi-telecentric imaging system shown in FIG. 3 leverages the symmetry present in the mirror system to create both object-space and image-space telecentric areas, enabling placement of both a rejection filter and an emission filter as depicted without sacrificing any light collection capability or imaging performance. For example, a rejection filter may be positioned in the object-space telecentric area 304 and the emission filter may be placed in the image-space telecentric area 306. In this manner, all filtering is done with chief rays parallel to each other and distances between chief rays is unchanged when adjusting focus. The magnification of this imaging technique, and therefore location accuracy, is quite insensitive to focus errors and therefore image-to-image or pass-to-pass registration is very robust. In certain aspects, a rejection filter includes one or more optical filter elements that reject (or filter out) excitation light wavelengths, while allowing other light wavelengths as desired to pass. Similarly, an emission filter includes one or more optical filter elements that allow emission band wavelengths to pass, while rejecting other wavelengths as desired. Examples of useful filters include notch filters to block most of the excitation light and band-pass filters to further block any residual excitation light leaking through the notch filter.

In the configuration shown, "Front" indicates an object plane, which may include a sample platform configured to hold a target irradiated by light and "Rear" may include a detector, such as a CCD detector array or other imaging device. A light source (not shown) illuminates the sample platform with light. In certain embodiments, the light source may include a diode laser or LED source, and various light conditioning and/or light guiding optical elements, configured to illuminate a portion of the sample platform facing toward or away the imaging system 310. The light beam (not shown) may be configured to illuminate an area on the sample platform for area imaging applications, or it may be configured to illuminate a line on the sample for line scanning applications.

As shown, the bi-telecentric optical imaging system may include an Offner relay mirror system arrangement comprising a first mirror element 303a having a spherical mirror surface and a second mirror element 303b having a spherical mirror surface, wherein the entry aperture and the exit aperture each comprise a portion of the first mirror element.

From every point on the sample area being imaged, there is a cone of light 308 that includes a chief ray at its center that travels along a first light path and passes through rejection filter in region 304 in a telecentric way; the chief ray is refocused by Offner mirror elements 303a and 303b to the image side where the chief ray travels along a second light path and passes through the emission filter in region 306 also in a telecentric way before it reaches the detector, e.g., detector array, also perpendicularly to it, in a telecentric way. Folding mirrors 204a and 204b (or other mirrors or components configured to re-direct light) are used to redirect the path for ease of packaging and coupling with a filter wheel assembly (e.g., filter wheel 110). For line scanning embodiments, with this imaging system, a strip area can be imaged in optically under fully telecentric filtering conditions. Larger sample areas may be covered by scanning the sample platform or the imaging system to other different areas and stitching all images together to produce a uniform, contiguous image of the desired total area.

Rotation of the filter wheel assembly (and hence the filters located in regions 304 and region 306) about the common axis 12 changes the filter configuration; for example, in a first filter configuration a first one of the first filters is positioned in the first light path in region 304 and the corresponding complementary filter is positioned in the second light path in region 306, and in a second filter configuration a second one of said first filters is positioned in the first light path and the corresponding complementary filter is positioned in the second light path.

As shown in FIG. 3, the rotatable filter wheel assembly is arranged in a first filter configuration filter with position #1 is active (see, FIG. 2A), where Front Filter$_1$ is currently positioned in the object-space telecentric area 304 and Rear Filter$_1$ is positioned in the image-space telecentric area 306. In this configuration, for optical imaging (e.g., fluorescence imaging), it may be desirable that Front Filter$_1$ act as a rejection filter to filter out the excitation light and Rear Filter$_1$ act as an emission filter. As disclosed herein, the rejection filter may include a notch filter or a long-pass filter, and the emission filter may include a band-pass filter or a long-pass filter.

The rotatable filter wheel assembly 10 may be manually adjustable and/or rotatable using an adjustment mechanism (e.g., including a stepper motor or other actuator) configured to rotate the filter wheel assembly to the desired configuration responsive to a control signal, e.g., responsive to a control signal received from the control system (not shown). The control system module includes a memory and is further adapted to acquire and store image data taken by the light detector of the detector subsystem.

Upon controlled rotation of the filter wheel assembly about the axis, different filter positions, and hence different filtering capabilities, may be achieved depending on the filter attributes for each position.

FIG. 4 illustrates an example of filter attributes for a two-level filter wheel assembly (e.g., filter wheel assembly 110) including 8 different positions or channels. As shown, the Front Filter for each of positions "1" through "8" may include a long-pass filter that blocks light having a wavelength less than or equal to the indicated wavelength and allows light having a wavelength longer than the indicated wavelength to pass, and the Rear Filter for each of the positions may include a band-pass filter that allows light only within the designated wavelength range to pass. It will be appreciated that a Rear Filter may include a long pass-filter. In certain embodiments, a variety or mix of filter types or absence of filters for the various positions may be included as desired.

The filter attributes shown in FIG. 4 may be useful for an optical imaging system that performs fluorescence imaging with up to 8 laser excitation wavelengths, as a fluorescence imaging embodiment. As shown, Front and Rear filters are arranged in fixed combinations, however the use of long pass and band pass filters allows for additional combinations. For example, all of the Front filters will block 450 nm laser light, so the filter wheel can be positioned to take advantage of any of the Rear emission filters to pass a wavelength other than the original Rear filter that is paired with the front 450 nm filter in position #1. This allows additional channels to be realized without increasing the filter wheel footprint.

Advantages of the Various Embodiments May Include:

Small footprint per channel, can scale for any even number of channels needed.

Only a single actuator required—implementing one or more of the following:

Open-loop with home flag position;

Closed-loop with rotary encoder added to back of motor; and

Manual, or other motorized actuation;

Low profile high resolution Stepper motor may be used.

Long pass rejection filters may be used to provide additional flexibility to add more channels without increasing the size of the filter wheel structure.

Other Embodied Features May Include:

2-level connected via one-way radial bearing (e.g., sprag clutch), or two-way friction bearing.

Example: Single actuator on lower level, clockwise rotation top level runs into stop, overrun to index new filter combination, counter-clockwise rotation—both levels rotate together to position filter combination in optical path.

Long Pass rejection filters can be replaced by Short Pass rejection filters for applications where the emission wavelength is less than the excitation wavelength.

When tilting of the filters with respect to the optical axis is desirable, rather than tilting the individual filters relative to the wheel axis, the filters may be mounted parallel to the wheel axis and the entire filter wheel may be tilted with respect to the optical axis.

The optical path, and elements, between the Front and Rear filters can take on other embodiments from what is shown in the figures.

The optical path entering/exiting the filter wheel can be of other orientations rather than parallel offsets as shown in the figures.

It should be appreciated that the optical filter elements in the filter wheel assemblies could be replaced with other optical elements such as windows, lenses, or other optical components not listed herein.

The filter wheel may be either manually adjusted or automated within the system, e.g., dependent on scan setting parameters selected by the user or automated control system.

Any assembly level may have as few as one optical filter element and/or optical components positioned around the axis or as many optical filter elements and/or optical components positioned around the axis as space permits.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

A "target of interest" may include a material or molecule of interest such as a biomolecule. Biomolecules are molecules of a type typically found in a biological system, whether such molecule is naturally occurring or the result of some external disturbance of the system (e.g., a disease, poisoning, genetic manipulation, etc.), as well as synthetic analogs and derivatives thereof (e.g. recombinant). Non-limiting examples of biomolecules include amino acids (naturally occurring or synthetic), peptides, polypeptides, glycosylated and unglycosylated proteins (e.g., polyclonal and monoclonal antibodies, receptors, interferons, enzymes, etc.), nucleosides, nucleotides, oligonucleotides (e.g., DNA, RNA, PNA oligos), polynucleotides (e.g., DNA, cDNA, RNA, etc.), carbohydrates, hormones, haptens, steroids, toxins, etc. Biomolecules may be isolated from natural sources, or they may be synthetic. The target of interest may be, for example, an enzyme or other protein. The target of interest may be a peptide or a polypeptide. The target of interest may be an antibody, antibody-like or a fragment of an antibody. The target of interest may be a nucleic acid molecule. The target of interest may include deoxyribonucleic acids (DNA) or ribonucleic acids (RNA). The target of interest may be a polynucleotide or other polymer. The target of interest may thus be, for example, proteins, nucleic acids, carbohydrates, lipids, or any other type of molecule.

The target of interest may be unmodified or the target of interest may be modified to contain one or more labels. An unmodified target of interest may be visualized through its inherent auto-fluorescent spectral properties during optical imaging. An unmodified target of interest comprising of non-fluorescent or non-excitable material may be visualized through the administration of one or more chemical stains to the sample comprising such unmodified target of interest prior to or during optical imaging. The target of interest may be modified to contain one or more labels through physical conjugation, chemical conjugation, genetic expression, etc. The one or more labels of the modified target of interest may comprise an excitable material. Non-limiting examples of labels include fluorescent materials (e.g. fluorophores or other like materials), phosphorescent materials (e.g. porphyrin or other like materials), bioluminescent materials (e.g. Luciferase expression or other like materials), chromophoric materials (e.g. chromophores or other like materials), etc. Embodiments of label materials of a target of interest may refer to any liquid, solid, or other type of material that absorbs light and re-emits at least a portion of what is absorbed as an optical signal (light) of a different spectral content as a measure of the amount present of that target of interest at that location.

Embodiments of the present invention with optical imaging systems address to imaging targets of interest contained in or on a sample. A "sample" includes and may refer to any liquid, solid, or other type of material that may be comprised of or as, in or on a cell or cells (e.g. in whole or lysed); a slurry or an extraction of cellular components; a tissue or tissues; an organ, organs, organoid or other organ-like materials; invertebrate or vertebrate organisms (i.e. in whole or in part); substrates such as but not limited to western blots, membranes, gels, plastic media, glass media or other media; or any combination thereof.

Exemplary embodiments are described herein. Variations of those exemplary embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A filter wheel assembly, comprising a plurality of optical filter pairs arranged around a common axis, wherein each of the plurality of optical filter pairs includes a first filter and a complementary filter, wherein each first filter and each complementary filter has a surface having a normal component directed toward an inner portion of the filter wheel assembly.

2. The filter wheel assembly of claim 1, wherein the plurality of optical filter pairs are arranged symmetrically around the common axis.

3. The filter wheel assembly of claim 1, wherein each first filter and each complementary filter has a planar surface.

4. The filter wheel assembly of claim 3, wherein the planar surface of at least one first filter and the planar surface of at least one complementary filter has a normal component that intersects the common axis.

5. The filter wheel assembly of claim 1, wherein for each optical filter pair of the plurality of optical filter pairs, the complementary filter is diametrically opposed to the first filter relative to the common axis.

6. The filter wheel assembly of claim 1, wherein each first filter comprises a rejection filter that blocks light having a wavelength less than a specific wavelength, and wherein each corresponding complementary filter comprises a bandpass filter that allows light having a wavelength within a specific range of wavelengths greater than the specific wavelength to pass, and wherein the specific wavelength of each first filter is different than the specific wavelength of the other first filters.

7. The filter wheel assembly of claim 1, wherein each first filter comprises a rejection filter that blocks light having a wavelength less than a specific wavelength, and wherein each corresponding complementary filter comprises a longpass filter that allows light having a wavelength range greater than the specific wavelength to pass, and wherein the specific wavelength of each first filter is different than the specific wavelength of the other first filters.

8. The filter wheel assembly of claim 1, wherein at least one first filter and the corresponding complementary filter do not block light of a specific wavelength.

9. The filter wheel assembly of claim 1, wherein at least one first filter and the corresponding complementary filter are arranged such that a planar surface of the at least one first filter and a planar surface of the corresponding complementary filter are arranged in a relationship to each other and at an angle relative to the axis.

10. The filter wheel assembly of claim 9, wherein the relationship is a parallel relationship.

11. The filter wheel assembly of claim 9, wherein the relationship is an equal angle relationship in opposite directions.

12. An imaging system comprising:
a source subsystem comprising:
a sample platform configured to hold a sample; and
a light source that illuminates the sample platform with light;
a detector subsystem for detecting light from the sample platform, and comprising a light detector having an array of sensing locations;
an optical imaging system comprising optical elements configured to receive light from the sample platform along a first light path and to pass or to direct the received light to the light detector along a second light path; and
a rotatable filter wheel assembly comprising a plurality of optical filter pairs arranged around a common axis, wherein each of the plurality of optical filter pairs includes a first filter and a complementary filter, wherein each first filter and each complementary filter has a surface having a normal component directed toward an inner portion of the rotatable filter wheel assembly,
wherein the rotatable filter wheel assembly is arranged in a first filter configuration and wherein rotation of the filter wheel assembly about the common axis changes the configuration to a second filter configuration, wherein in the first filter configuration a first one of said first filters is positioned in the first light path and the corresponding complementary filter is positioned in the second light path, and in the second filter configuration a second one of said first filters is positioned in the first light path and the corresponding complementary filter is positioned in the second light path.

13. The imaging system of claim 12, wherein the optical imaging system comprises a bi-telecentric optical imaging system including imaging optics arranged and positioned such that a first telecentric space exists in the first light path between the sample platform and the entry aperture, wherein Principal rays from a plurality of field points on the sample platform are parallel to each other when passing through the first filter in the first light path, and such that a second telecentric space exists in the second light path between the light detector and the exit aperture, wherein the Principal rays from the plurality of field points are parallel to each other when passing through the second filter in the second light path.

14. The imaging system of claim 12, wherein the bi-telecentric optical imaging system comprises an Offner relay mirror system arrangement comprising a first mirror element having a spherical mirror surface and a second mirror element having a spherical mirror surface, wherein the entry aperture and the exit aperture each comprise a portion of the first mirror element.

15. The imaging system of claim 12, wherein the plurality of optical filter pairs are arranged in a single level, said single level being defined by a plane arranged substantially normal to the axis.

16. The imaging system of claim 12, wherein the plurality of optical filter pairs are arranged in two or more levels, each of the two or more levels defined by a plane arranged substantially normal to the axis and parallel to the planes defined by the other level or levels.

17. The imaging system of claim 16, wherein each first filter is arranged on a first one of the two or more levels, and wherein each corresponding complementary filter is arranged on a second one of the two or more levels.

18. The imaging system of claim 12, wherein the light source comprises a diode laser, or a LED.

19. The imaging system of claim 12, further comprising at least one or more additional light sources.

20. The imaging system of claim 12, wherein the light detector comprises at least one detector selected from the group consisting of a CCD array detector, a CMOS detector, a sCMOS detector, a photomultiplier device, a photodiode, a plurality of photodiodes, and a focal plane array.

21. The imaging system of claim 12, further including a control system module comprising at least one processor, wherein the control system module is adapted to automatically control rotation of the filter wheel assembly.

22. The imaging system of claim 21, wherein the control system module is further adapted to acquire and store image data taken by the light detector from the detector subsystem.

23. The imaging system of claim 12, wherein the sample includes one or more targets of interest, and wherein the optical imaging system is configured to image the one or more targets of interest onto the light detector.

24. An optical component assembly, comprising a plurality of optical component pairs arranged around a common axis, wherein each of the plurality of optical component pairs includes a first optical component and a complementary optical component, wherein each first optical component and each complementary optical component has a surface having a normal component directed toward an inner portion of the optical component assembly.

25. The optical component assembly of claim 24, wherein at least one of the plurality of optical component pairs comprises a first optical filter and a complementary optical filter.

* * * * *